United States Patent [19]

Khan

[11] Patent Number: 4,561,095
[45] Date of Patent: Dec. 24, 1985

[54] HIGH-SPEED ERROR CORRECTING RANDOM ACCESS MEMORY SYSTEM

[75] Inventor: Aurangzeb K. Khan, Sunnyvale, Calif.

[73] Assignee: Fairchild Camera & Instrument Corporation, Mountain View, Calif.

[21] Appl. No.: 399,670

[22] Filed: Jul. 19, 1982

[51] Int. Cl.[4] .............................................. G06F 11/10
[52] U.S. Cl. .......................................... 371/38; 371/3
[58] Field of Search ..................... 371/38, 37, 39, 40, 371/3

[56] References Cited

U.S. PATENT DOCUMENTS

| | | | |
|---|---|---|---|
| 4,072,853 | 2/1978 | Barlow et al. | 371/38 |
| 4,345,328 | 8/1982 | White | 371/38 |
| 4,359,771 | 11/1982 | Johnson et al. | 371/38 X |
| 4,388,684 | 6/1983 | Nibby, Jr. et al. | 371/38 X |

OTHER PUBLICATIONS

Blazejewski et al., Mechanism for Checking Parity and Error Checking, etc., IBM Technical Disclosure Bulletin, vol. 21, No. 12, May 1979, pp. 4871–4877.

*Primary Examiner*—Charles E. Atkinson
*Attorney, Agent, or Firm*—Carl L. Silverman; Dave Carroll

[57] ABSTRACT

A high speed error correcting random access memory system includes a circuit for generation of a plurality of parity bits from a predetermined combination of data bits of a data word being stored in a random access memory such that these parity bits are stored in memory along with said data bits, and for outputting the data word from said memory system, including correcting for any single bit error in the data word, by a circuit that generates a check word from the data word bits and parity word bits stored in the memory, whose state indicates if any of the data bits are in error, and, if so, proceeds to correct any such erroneous bit. The system also includes a circuit for inserting an erroneous bit of data in memory after the parity bits have been generated, to check operation of the check word generating and output data word correction circuit. The operation of the check word generating circuit can also be suspended so as to enable uncorrected data words to be output by the memory system.

23 Claims, 11 Drawing Figures

HIGH-SPEED ERROR CORRECTING RANDOM ACCESS MEMORY SYSTEM

THE BACKGROUND OF THE INVENTION

The present invention relates in general to error correcting circuits for random access memory devices and more specifically to an error correcting circuit providing high speed single bit error checking and correction for each word in the memory.

An increasingly serious problem in random access memory (RAM) devices is the failure of a memory cell on an impermanent basis, i.e. a "soft failure". This mode is distinct from a "hard failure" mode, wherein a given memory cell is permanently stuck in a particular state, i.e. stuck in a "0" or "1" state.

A soft failure may occur in a normally functional memory cell as a result of any one of the following identifiable mechanisms. The main source of soft failures is stray radiation that passes through a memory cell and releases some amount of charge. If large enough, this stray transient charge will cause the memory cell to change state from a correct state to an erroneous state. The most common type of radiation is alpha radiation, although the same effect has been reported with cosmic and gamma rays. Alpha radiation can arise from trace contaminants in the packaging material used to house the memory, e.g. an integrated circuit package, or from some source external to the memory. Cosmic rays originating in outer space, for example, constantly impinge on the earth in a random manner. A significant characteristic of such soft failures in a memory device is that they are randomly distributed, they generally occur infrequently, and in each instance a soft failure only occurs in a single bit location (a single memory cell) within the memory.

A second source of soft failures is that a given memory cell may be only marginally functional, e.g. a cell that is unable to retain a specified minimum voltage swing. Such a cell may be disturbed by an accidental transient pulse originating as a result of its proximity to another cell in the memory being addressed at that point in time, or from some other source.

Improving data integrity in random access memory devices, by correcting for soft failures, has only become important in recent years. In the past, such failures have been of little concern due to a Mean Time Beteeen Failure (MTBF) which has been calculated to be on the order of $10^7$ hours per device. However, this Mean Time Between Failure number in a systems context has been greatly aggravated as a result of the increased amount of memory existing in many electronic systems, i.e. systems having a thousand RAM chips are no longer uncommon. The MTBF number has also worsened as a result of the fact that the minimum size of a particular memory cell is constantly being reduced with improved technology. This latter improvement means that, by comparison with the past, smaller and smaller increments of charge are used to hold information in the memory cell. As a consequence, a given amount of stray charge striking a memory cell will now have a much greater proportionate effect on the cell, such that it is more likely that this stray charge will cause the memory cell to change state and thereby create an error.

Thus, in present day systems, radiation induced or electronically induced soft failure errors in a system memory may occur with a rate on the order of one per week or even one per day. In a system requiring a high level of reliability in its calculations using data stored in memory, an error rate this high is unacceptable.

Single bit soft error correction has not generally been performed in prior art memory systems, since other error modes tended to be more significant and the rate of occurrence of such soft errors was infrequent enough to generally go unnoticed. Another problem with single bit soft error correction is that in conventional implementations, it is complex to implement and tends to seriously degrade the read/write speed of the random access memory, as well as other system performance parameters.

Prior art error correction systems have also only generally provided for a single parity bit to be generated, i.e. an odd or even parity bit. The system then tests for an erroneous parity in the word once the word is read out from the memory. Such a testing scheme does not enable the system to discern which specific bit or bits is in error in a word having such a parity error. As a consequence, the entire data word is lost when a parity error is found.

SUMMARY OF THE INVENTION

Therefore, an object of the present invention is to provide an error correcting random access memory system wherein a single bit soft or hard failure in any given word of the memory is detected and corrected, while minimizing degradation of the read/write speed of the memory resulting from such error correction.

Another object of the present invention is to provide an error correcting random access memory system wherein the error correcting means includes generation of a parity word for each word stored in memory, said parity word having a plurality of parity bits, and wherein said means is incorporated on an integrated circuit chip also containing the random access memory, to enable parallel processing of parity and data bits during memory read and write operations and thereby to enhance read/write speed.

Yet another object of the present invention is to provide an error correcting random access memory system wherein error correction is automatic and transparent to the memory user except when the user selects one or more special operational modes that enable testing of memory operation.

Another object of the present invention is to provide an integrated circuit error correcting random access memory system wherein the means for testing of the error correction circuit does not include the necessity for the existence of additional pins on an integrated circuit chip.

Still another object of the present invention is to provide an error correcting random access memory system that will permanently correct for single bit hard failures in a given word of the random access memory.

Another object of the present invention is to provide an integrated circuit error correcting random access memory system implemented in high speed emitter coupled logic circuitry.

Broadly stated, the present invention is a high speed error correcting random access memory system comprising a memory array for storing data in a plurality of addressable memory words, each memory word having a predetermined equal number of memory cells. A data word having a preselected number of bits is input to said random access memory and stored in a selected one of the memory words, such that each bit of the data word is stored in a corresponding memory cell of the selected memory word. Means are also provided for generating from the data word a parity word having a preselected plurality of parity bits, wherein the state of each parity bit is the function of a different combination of data word bits. This parity word is also stored in said selected memory word, in the remaining memory cells therein. Means are also provided for reading out a selected memory word including means for reading out the memory cells containing the data word and for reading out the memory cells containing the parity word. A check word is generated from the data word bits and the parity word bits such that the state of this check word indicates if any data word bit has switched to an erroneous state, and, if so, identifies that specific erroneous data bit. Lastly, means responsive to the check word state are provided for correcting any such data bit found to be in an erroneous state. This data word, as corrected if necessary, is then output by the random access memory.

The present invention further includes means for causing a selected bit in the data word input to the memory to switch to an erroneous state after the parity word is generated and for storing the data word with this artificial error in the selected memory word. This provides means for testing the operability of the error correcting means according to the present invention.

A second means for testing the operability of the error correcting means comprises means for selectively suspending the operation of the check word generation means, so as to enable uncorrected data words to be output by the random access memory.

The present invention further includes novel circuits for implementation of the above described functions on an integrated circuit "chip" in combination with conventional random access memory circuit functions, so as to minimize delay in writing a data word into memory caused by the additional coding time required for generation of multiple parity bits, and to minimize delay in reading a data word from memory caused by additional time needed to check for errors in the data bits when the data word is being output.

BRIEF DESCRIPTION OF THE DRAWINGS

Other objects of the present invention will become apparent from a study of the following specification and drawings, in which.

DETAILED DESCRIPTION

Figure 1:
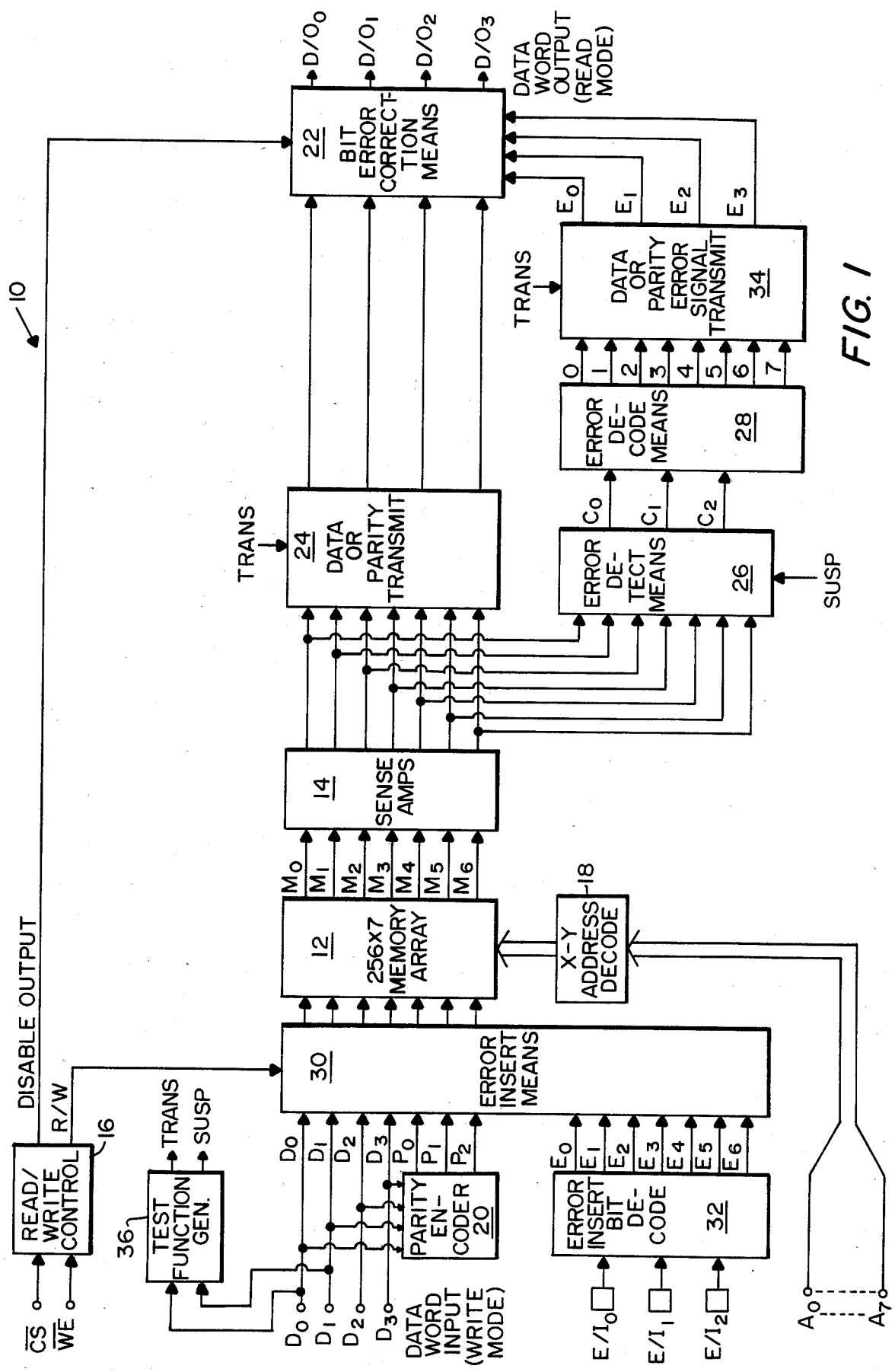
FIG. 1 is a block diagram of an error correcting random access memory system according to the present invention.

Referring now to FIG. 1, illustrated is a preferred embodiment of a system 10 for correcting single bit errors with minimum delay in an otherwise conventional integrated circuit random access memory. In the illustrated embodiment of FIG. 1, a systems user would perceive the memory system as a random access memory having conventional storage capabilities, e.g. 256 words of 4 bits each (a 256×4 memory). A data word is input to the system 10 on lines $D_0$–$D_3$ for writing this data into a selected memory word in a memory array 12. Subsequent readout of a selected memory word from memory array 12 is via sense amps 14. This word is then output on data output lines $D/O_0$–$D/O_3$. These read and write operations are performed under the control of a read/write control means 16 fed by conventional write enable (WE) and chip select (CS) lines input thereto. Again, in a conventional manner, the specific memory locations selected for storage of the data word in the memory array 12 during a write mode of the memory system, and the specific memory location in memory array 12 selected for data word output during a read mode is determined by the state of a plurality of address lines $A_0$ to $A_7$ input to system 10. These address signals $A_0$–$A_7$ are fed to a conventional X and Y address decode means 18, to enable identification of a specific memory word location in memory array 12.

Error correction of data stored in the memory system 10 requires two separate processing stages. Initially, the data word input to the memory must be processed during a write mode, including means for generating from the data word a parity word having a preselected plurality of parity bits. The memory array 12 includes additional memory cells or bits for each word in the memory for storage of the generated parity word along with the data word in the same selected memory word. The second required error correction processing step is needed during a read mode, wherein a check word is generated whose state indicates if any single bit in the data word being read out from memory has switched to an erroneous state, and, if so, to identify that specific erroneous data bit. Means are then provided for correcting any said identified erroneous data bit in the data word prior to its output.

More specifically, as illustrated in FIG. 1, during a write operation, the input data word is coupled to a parity encoder 20 which functions to generate a plurality of parity bits. As hereinafter described in greater detail, each parity bit is a function of the state of a different combination of the data word bits coupled thereto. The data word bits $D_0$–$D_3$ and the newly generated parity bits $P_0$–$P_2$ are then fed to the memory array 12, for storage in a memory word selected by means of address lines $A_0$–$A_7$. In accordance with the preferred embodiment, for a four bit data word, three parity bits are needed for implementation of the present invention. Consequently, memory array 12 requires that each memory word have the capability to store 7 bits of information, i.e. the four data bits and the three added parity bits, in each memory word.

It should be noted here that the size of the storage capacity of a memory array 12 is not limited to 256 words by 7 bits. Any number of four bit data words can be stored in such an array, limited only by the number of memory locations a system can address in some way. The present invention only requires that, for a four bit data word, the memory provide 7 bits of storage for each word. Data words having a greater or lesser number of bits per word, e.g. 8 bits, are also envisioned as being within the scope of the present invention, although for high speed consideration, a 4 bit data word is deemed optimum. In the 8 bit data word example, in addition to the need for four more bits of storage in each memory word to store the added data bits, one extra parity word bit would need to be generated, for a total of four parity bits. A larger check word would also be required. A number of factors limit the expandability of memory systems according to the present invention beyond about 11 data word bits per memory chip for high speed applications. The most significant factor is that, to maximize memory speed, both the parity word generation and the check word generation is implemented in a two level, AND-OR, form rather than in a more conventional exclusive-OR form. This enhances processing speed, because processing is in parallel AND-OR gates rather than in series cascaded exclusive-OR gates. The drawback is that the number of "AND terms," i.e. AND gates, needed to implement the word generation needed goes up exponentially. As will be seen below, the three bit check word of the preferred embodiment, requires 24 AND terms to implement the check word derivation. A four bit check word would require 512 AND terms, and a five bit check word would require over 100,000 AND terms. Where greater word bit length is needed, however, a cascaded memory system can be implemented in a conventional manner to enable error correcting of such larger data words. For example, three memories, each having 4 bit data words, may be cascaded together in a parallel network to create a memory capable of storing words that are 12 bits in length.

During a read mode operation, when a data word that is stored in memory array 12 is to be output, this word is selectively addressed, via address lines $A_0$–$A_7$, such that all 7 bits of data stored in the memory word location (bits $M_0$–$M_6$ in FIG. 1) are coupled via respective sense amps 14 to a bit error correction means 22, and thereby output as output data comprising bits as $D/O_0$ to $D/O_3$. A data or parity transmit means 24, interposed between sense amps 14 and bit error correction means 22, enables selection of either the four data bits $D_0$–$D_3$ to be output or if a test mode is desired, the 3 parity bits to be output, on the data word output bit lines $D/O_0$–$D/O_3$. To determine if any bits $M_0$–$M_6$ have changed state while stored in memory array 12, all 7 such bits are fed to an error detect means 26. Error detect means 26 generates the above described check word from the data word bits and the parity word bits. In the present four bit data word embodiment, the check word comprises 3 bits, $C_0$–$C_2$, whose state will indicate if any single data word bit has switched to an erroneous bit, and if so, will identify that specific erroneous data bit. An error decode means 28 functions to separate out the 8 possible states of check word $C_0$–$C_2$, and outputs these states on respective lines 0–7, such that each output of error decode 28 will correspond to a different one of the 7 bits $M_0$–$M_6$. As hereinafter described, if output line "0" of error decode 28 is high, this means that no bit error in either the 4 data word bits or the 3 parity word bits has been detected, i.e. $C_0$–$C_2$ is in a 000 state. However, if any of the outputs 1–7 of error decode 28 is high, and only one such bit would be high at any given time, this state indicates that the specific corresponding bit in word $M_0$–$M_6$ is in an erroneous state, that it has erroneously changed to an incorrect state during storage or at some other point after the parity word was generated for that data word.

The above described outputs 0–7 of error decode 28 are coupled to the bit error correction means 22 and function to enable any specific bit that is found to have been in error to have its state changed. In other words, if any output line 1–7 is high, the error correction means causes the corresponding data or parity word bit to change state, so that as a result, the output data word bits on lines $D/O_0$ to $D/O_3$ are the data word bits corresponding identically to the data word bits as originally input to the random access memory system 10 on lines $D_0$ to $D_3$.

An additional function conventionally provided in certain random access memory systems is a disable output signal which functions to prevent any signal output from the memory when that integrated circuit chip has not been selected. As seen in FIG. 1, the read/write control 16 generates this disable signal, in addition to generation of a conventional read/write signal (R/W), and this signal is coupled to the bit error correction means 22. This latter means 22 acts in response thereto to disable any output signal on lines $D/O_0$–$D/O_3$.

Various testing features are also provided to both test the operation of the memory independent of the error correction means described above, and also to circumvent portions of the operation of the error correcting means to insure its proper operation. Suspension of the operation of the error correcting means is required, because otherwise during initial testing of the device, any hard failure errors existing in the memory array would be transparent and undetectable as a result of the operation of the present invention. That is, any single bit in one or more memory word in memory array 12 that is permanently in either a logic 0 or logic 1 state would be automatically corrected due to the operation of the above described error correcting means. Such defects can be ignored, thus enhancing the yield of integrated circuit memory systems having such error correction, but such yield enhancement would be at the expense of improved data integrity enabled by the error correcting means according to the present invention. It should also be noted, however, that fully one seventh of the memory cells in a memory array 12 could be hard failures, so long as no greater than one bit per each memory word has failed, and still have such errors be transparent to a system user. Of course, in such an extreme situation, there would be virtually no increase in data integrity enabled by the error correcting circuit according to the present invention.

The error correction circuit testing features provided by the memory system 10 according to the present invention may specifically include error insert means 30 for causing a selected bit in the input data word $D_0$ $D_3$ to switch to an opposite or erroneous state after the parity word has been encoded by parity encoder 20 but before the data word is input to, and stored in memory array 12. Thus, error insert means 30 insures that a single bit error exists in that given data word. This enables verification of the operation of the output error detect means 26 and the bit error correction means 22.

Note that the error insert means 30 may also be provided to generate an erroneous bit in the parity word rather than in the data word. Various means are available in a conventional manner for input of control signals to an error insert means 30 to enable it to generate an erroneous bit on one of the data lines $D_0$–$D_3$. In a preferred embodiment, the error insert 30 is fed by 7 error bits $E_0$–$E_6$, wherein if any one of those input bit lines is high the corresponding input line $D_0$–$D_3$ or $P_0$–$P_2$ is caused to change state. Input bit lines $E_0$–$E_6$ can be generated by an error insert bit decode 32 in a conventional manner from a three bit input error insert word $E/I_0$–$E/I_2$. Again, in the preferred embodiment, means provided by error detect means 26, so as to enable an uncorrected data word or an uncorrected parity word to be output by the memory system 10. The transmit control signal is fed to the data or parity transmit unit 24 for selecting either the 4 data bits or the 3 parity bits in these respective words to be fed to the bit error correction means 22. Similarly, the transmit control signal is fed to a data or parity error signal transmit means 34 for providing an identical selection between the error bits generated by the check word $C_0$–$C_2$ for respectively the data word bits or the parity word bits. The output of the error signal transmit means 34 is also fed to the bit error correction means 22.

Table I illustrates in diagramatical form the selection of the four possible read modes.

TABLE I

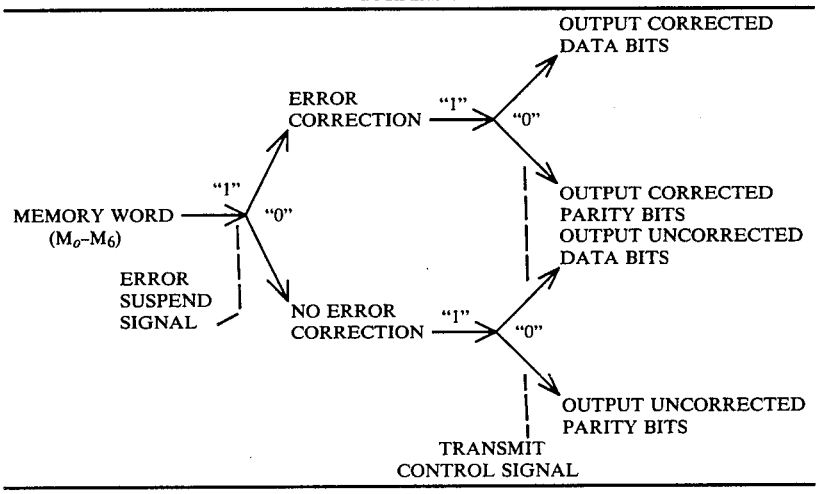

to prevent the need for additional pins in the integrated circuit memory system 10, the error insert word $E/I_0$–$E/I_2$ inputs to error insert bit decode 32 are only accessible on pads on the integrated circuit "chip" on which the error correction random access memory system 10 is defined. This is preferred since it is not envisioned that a system user would need to insert such single bit errors into the memory system 10 to test for operability thereof. This is a function which would normally only be done during construction of the apparatus according to the present invention at an intermediate stage thereof. However, if extra pins external to the integrated circuit package are available, such a function could be made available to the system user. It may also be possible to multiplex this three bit error word on some other pins normally used for some other purpose, in a manner as hereinafter described.

Figure 10:
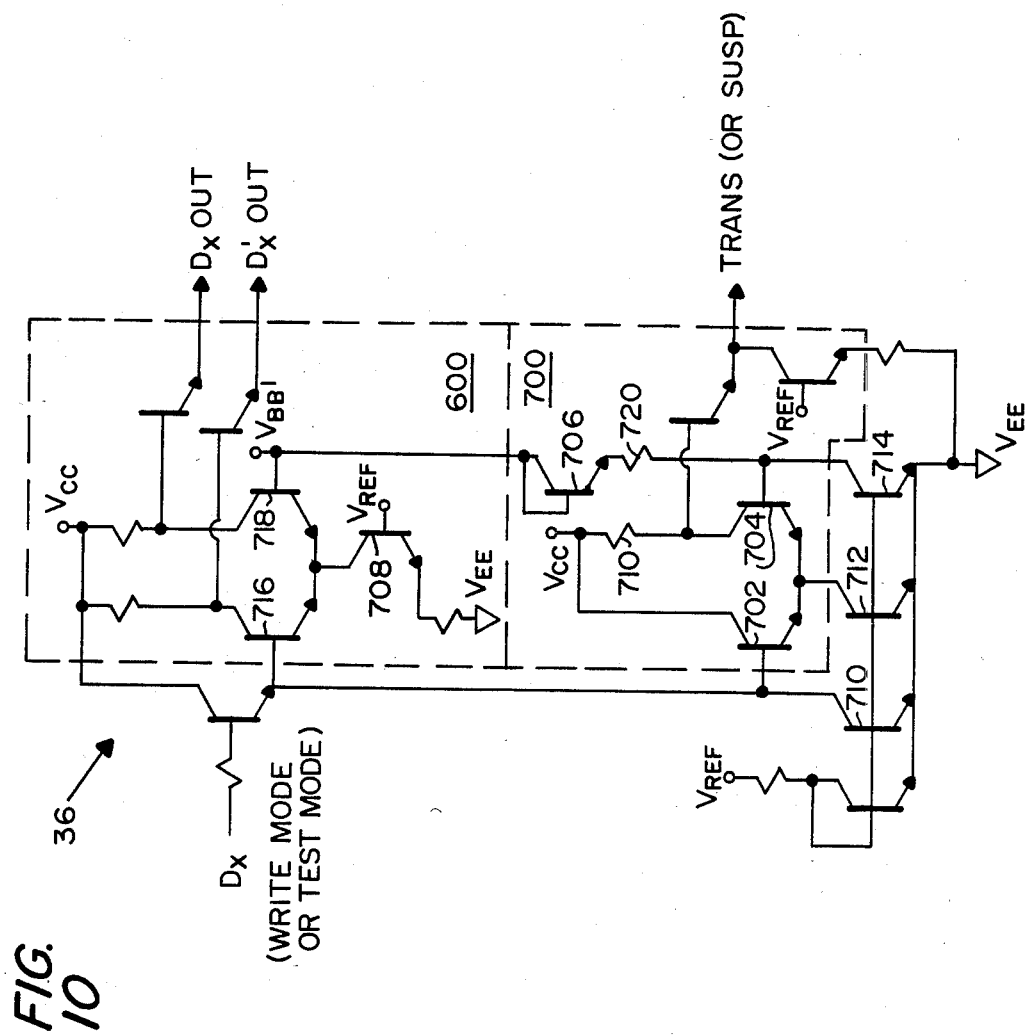
FIG. 10 is a detailed schematic of means for generating a suspense signal and a transmit signal according to the present invention.

Referring now to the testing features available during the read mode operation of the error correcting random access memory system according to the present invention, four separate modes of operation are enabled: (1) corrected data bits can be output on the data word output lines $D/O_0$–$D/O_3$; (2) corrected parity bits can be output; (3) uncorrected data bits can be output; or (4) uncorrected parity bits can be output on lines $D/O_0$ to $D/O_3$. These output functions are enabled through the operation of two additional control signals, the transmit control signal (TRANS) and the error suspend signal (SUSP). The transmit control signal TRANS selectively enables the parity word to be output by the system 10 instead of the output data word. The error suspend signal SUSP enables a system user to selectively suspend the operation of the check word generating Both the transmit control signal and the error suspend signal are generated by a test function generator 36 which, in the preferred embodiment, is derived from a multiplexed input to pins $D_0$ and $D_1$. Details of the operation of test function generator 36 is given below and is illustrated in FIG. 10. It would be conventional to provide two additional input pins to the integrated circuit memory system 10 to enable the transmit control and suspense signals to be input thereto.

As described above, error detection and correction requires two processing stages, the processing, during a memory write mode, that is performed by parity encoder 20 prior to storage of a data word in memory array 12, and the processing, during a memory read mode, of a data word being read from the memory of array 12 by error detect means 26. Parity encoder 20 generates a parity word that is stored along with the data word in memory array 12, and error detect means 26 takes the combined data and parity word and generates a check word therefrom. In a preferred embodiment, the Hamming algorithm is used to implement the coding and decoding functions required to generate this parity word and check word. Specifically, the parity bits of the parity word are generated by determining the even parity of preselected groups of input data bits. Subsequently, the 7 bit word output by memory array 12, comprising the 4 data bits and the 3 parity bits, is checked for odd parity through the generation of the check word. If odd parity is found, this will indicate that at least one bit in the memory word is no longer in a correct state.

The specific equations used to obtain the even parity bits of the parity word, in implementation of the above algorithm, are as follows:

$$P_0 = D_0 \oplus D_1 \oplus D_3$$

$$P_1 = D_0 \oplus D_2 \oplus D_3$$

$$P_2 = D_1 \oplus D_2 \oplus D_3$$

It would be within the ordinary skill of the art to cascade exclusive-OR gates to implement the above equations for encoding a parity word according to the present invention. For larger data words (e.g. equal to or greater than 16 bits each), a several stage cascade of exclusive-OR gates is possible. The penalty with such circuitry, however, is that there is a significant degradation in read/write speed of a memory incorporating such circuitry. If the data word can be limited to 8 bits or less, preferably 4 bits as in the preferred embodiment herein, a two-level "sparse" logic array is available, wherein the logic is implemented in AND-OR or OR-AND canonical form. Therefore, implementing the above equation for the parity word in AND-OR canonical form leads, in a conventional manner, to the following equations:

$$P_0 = (D_3 + D_1 + D_0)(D_3 + D_1' + D_0')(D_3' + D_1 + D_0')$$
$$(D_3' + D_1' + D_0)$$

$$P_1 + (D_0 + D_2 + D_3)(D_0 + D_2' + D_3')(D_0' + D_2 + D_3')$$
$$(D_0' + D_2' + D_3)$$

$$P_2 = (D_1 + D_2 + D_3)(D_1 + D_2' + D_3')(D_1' + D_2 + D_3')$$
$$(D_1' + D_2' + D_3)$$

Figure 2:
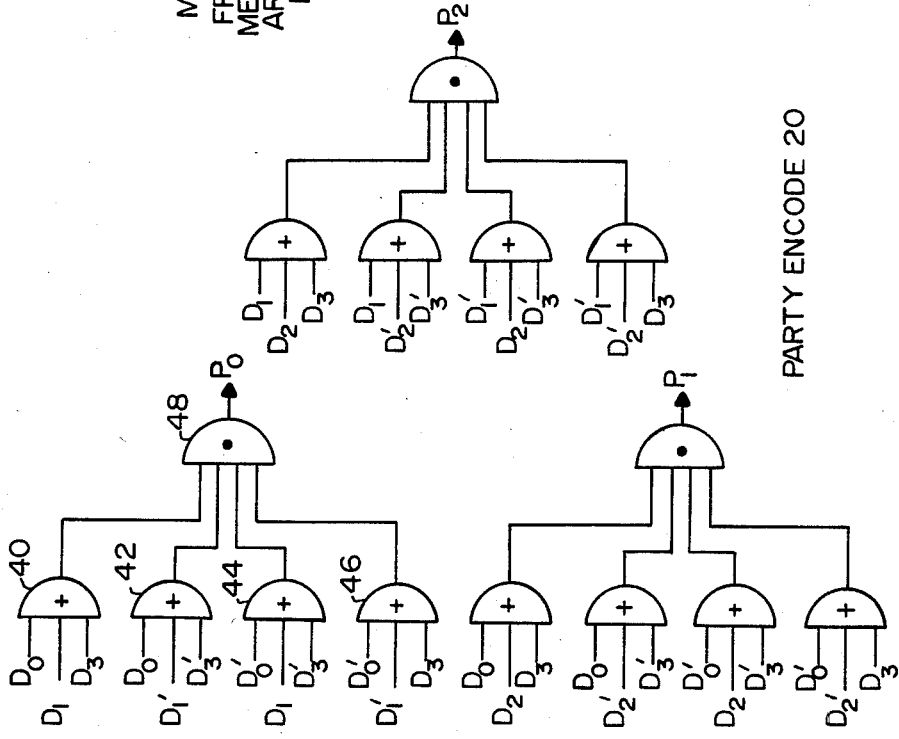
FIG. 2 is a logic diagram of parity word generation means according to the present invention.

Illustrated in FIG. 2 is a logic diagram illustrating the implementation of the above three equations to generate parity bits $P_0$–$P_2$. As can be seen, each parity bit requires four OR gates and one AND gate to implement the above described parity functions. For example, for $P_0$, the four OR gates comprise gates 40, 42, 44 and 46 and the AND gate is gate 48. As will be seen with respect to a detailed schematic implementation of this logic, shown in FIG. 6, the canonical form provides advantages in terms of the ease and compactness of the layout available and in terms of the design flexibility arising from the programmability of the AND-OR functions by means of multiple transistor emitter connections.

The relevant decoding/checking equations required to implement generation of a check word, as provided by error detect means 26 involve the following equations:

$$C_0 = P_0 \oplus D_0 \oplus D_1 \oplus D_3$$

$$C_1 = P_1 \oplus D_0 \oplus D_2 \oplus D_3$$

$$C_2 = P_2 \oplus D_1 \oplus D_2 \oplus D_3$$

As previously mentioned, this check word $C_0$, $C_1$, $C_2$ provides the output odd parity checking of the memory word obtained from the memory array 12, such that the state of the check word points to a specific erroneous bit, if any, in the 7 bit memory word. Thus, for example, if $C_0$ $C_1$ $C_2$ is 000, this means that no error has been detected. If the state of the check word is 010, however, this indicates that bit number 2 is in an incorrect state. With the above arrangement of odd parity checking equations, the order of the memory word bits corresponding to the 8 states of the check word is $D_3$, $D_2$, $D_1$, $P_2$, $D_0$, $P_1$ and $P_0$. Thus, if bit number 2 is wrong, this indicates that $P_1$ has erroneously changed state while stored in memory array 12. A third example would be if all three bits, $C_2$, $C_1$ and $C_0$ were in a "1" state, this would indicate that the eight bit, or $D_3$, has incorrectly changed state. As described above, error decode means 28 decodes the three bit check word into eight separate output line signals, each corresponding to a specific one of the output memory word bits.

Implementing the above checking equations for $C_0$, $C_1$ and $C_2$ also is more efficient using "sparse" logic for the same reasons as previously described with respect to the generation of the parity bits by the parity encode 20. Thus, implementing the checking equations in canonical form provides the following results:

$$C_0 = (D_3 + D_1 + D_0 + P_0)(D_3 + D_1 + D_0' + P_0')$$
$$(D_3 + D_1' + D_0 + P_0')(D_3 + D_1' + D_0' + P_0) +$$
$$P_0)(D_3' + D_1 + D_0 + P_0')(D_3' + D_1 + D_0' +$$
$$P_0)(D_3' + D_1' + D_0 + P_0)(D_3' + D_1' + D_0' + P_0')$$

Figure 3:
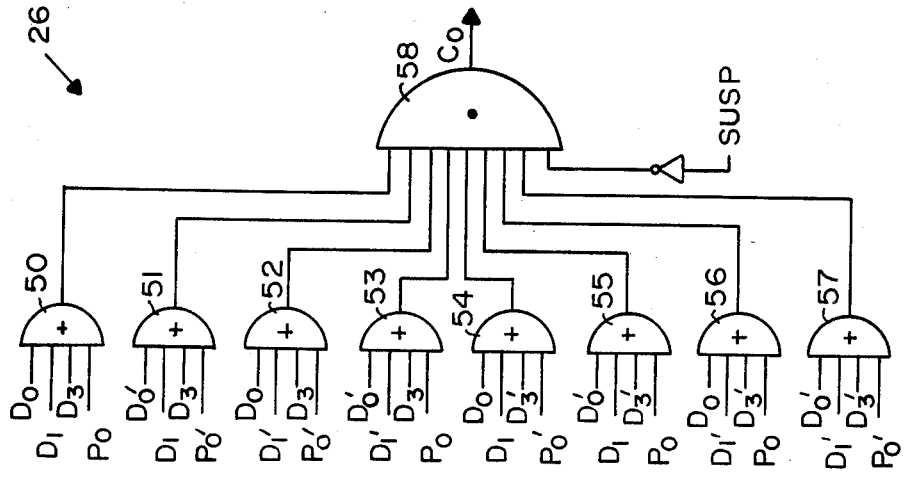
FIG. 3 is a partial logic diagram of check word generating means according to the present invention.

The equations for $C_1$ and $C_2$, being of the same form as for $C_0$ described above, only with different variables, are therefore not duplicated here. FIG. 3 illustrates a logic circuit implementation for the above described equation for $C_0$. As can be seen, eight separate OR gates 50–57 and one AND gate 58 are needed. As can be seen, this logic implementation is substantially identical to the implementation for each of the parity generated bits by parity encode 20, except that with the addition of a fourth variable, eight OR gates are needed instead of four to implement the same function. All eight of these OR gates 50–57 are fed to one AND gate 58 to complete implementation of the equation for $C_0$. Since the equations for $C_1$ and $C_2$ are of the same form as for $C_0$, each of these check bits is derivable from the same logic array of eight OR gates and one AND gate in the same manner again as for the parity bits logic implementation of FIG. 2 for parity encode 20.

As mentioned above, one of the features of the error detect means 26 is that operation of the error detect means 26 may be suspended when a system user desires a testing mode for the system 10. As seen in FIG. 3, this function is implemented by inputting the error suspend signal SUSP to AND gate 58 via an inverter gate 62. Consequently, whenever the SUSP signal is high, this forces signal $C_0$ from AND gate 58 to a "0" state. An identical circuit is provided for both circuits generating $C_1$ and $C_2$, such that whenever the error suspend signal is high, $C_0$, $C_1$, $C_2$ will appear in a 000 state to the error decode means 28, thereby indicating the existence of no error. Consequently, if a bit error in fact exists in the data word being analyzed at that time, that data word will remain uncorrected by the output bit error correction means 22.

Figure 4:
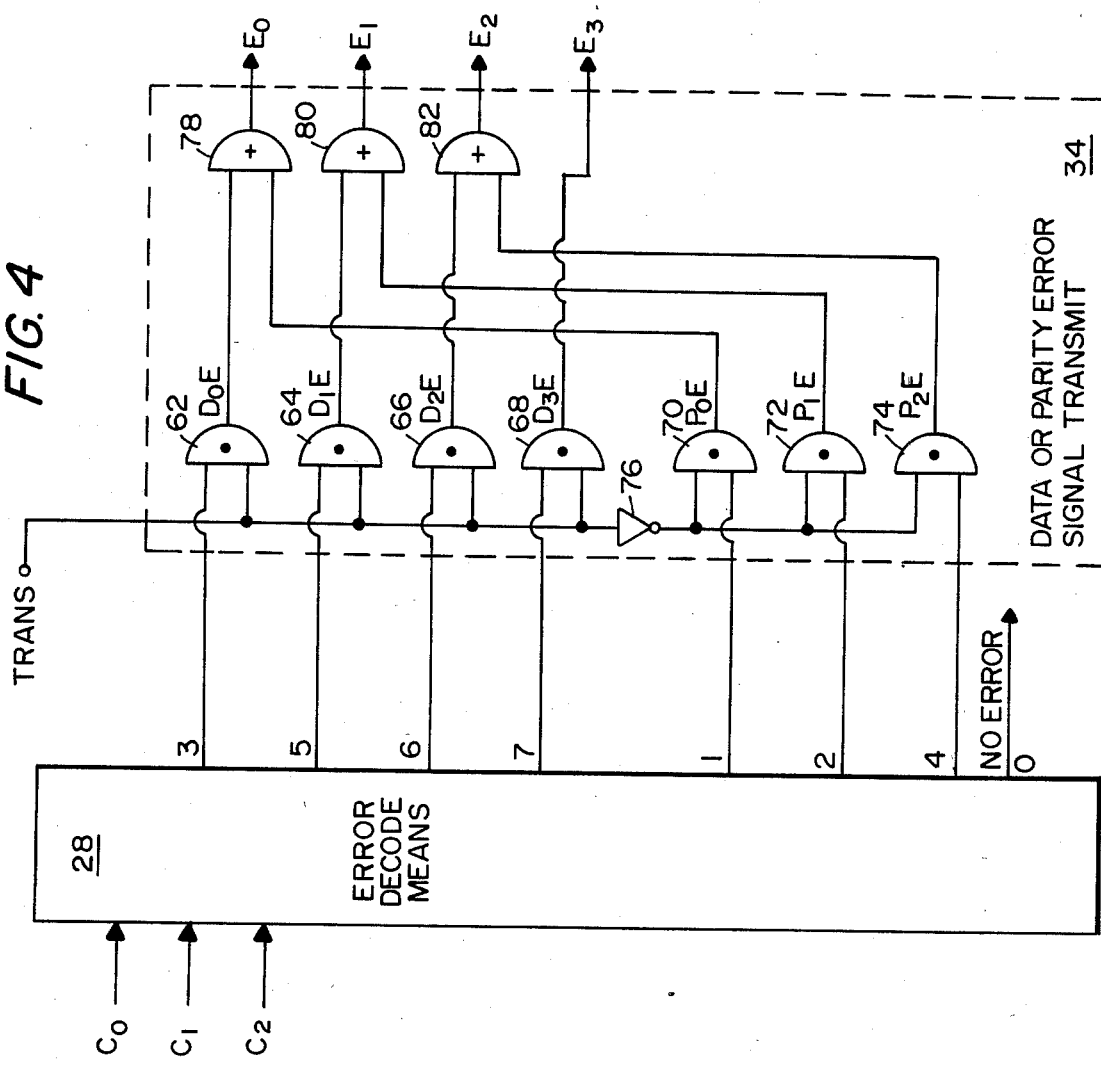
FIG. 4 is a logic diagram of the data or parity error signal transmit means shown in FIG. 1.

A more detailed logic diagram of the operation of the error decode means 28 and the data or parity error signal transmit 34 is provided in FIG. 4. As previously mentioned, the data or parity error signal transmit 34 is provided to give the option during a read mode of outputting error signal bits corresponding to the data word or error signal bits corresponding to the parity word. The transmit control signal TRANS provides the selection means for this function. As will be discussed hereinbelow, the same data or parity error signal transmit logic functions exist in the data or parity bits transmit means 24, and this circuit function will be described hereinbelow with respect to FIG. 5. Referring again to FIG. 4, as can be seen, the error decode means 28 takes the three bit check word $C_0$–$C_2$ and generates eight separate output lines 0–7, such that only one of the output lines will be high for any state of the check word $C_0$–$C_2$. This one high line will correspond either to no error, if $C_0$, $C_1$ and $C_2$ are all zero, or to an error in a specific bit location, one of the four data bits on one of the three parity bits. As previously described by way of example, if bit location 2 is high, then output line 2 of decode means 28 will be high, indicating that there is an error in the 7 bit data word bit location corresponding to $P_1$, the second parity bit.

The 7 output lines generated by the error decode means 28 are fed to the data or parity error signal transmit unit 34. Select unit 34 includes an array of AND gates 62, 64, 66, 68, 70, 72 and 74. The other input to these AND gates 62–74 is the transmit control signal TRANS, with one polarity state of the TRANS signal being fed to gates 62–68 corresponding to the data bits, and the opposite polarity state of the TRANS signal fed to the gates 70–74 corresponding to the parity bits. This state inversion function for the transmit control signal is provided by inverting gate 76. Thus, if the TRANS signal is in a high or a "1" state, AND gates 62–68 are enabled, such that the error signal bits output to the bit error correction means 22 via lines $E_0$–$E_3$ correspond to the data bits $D_0$–$D_3$. If the TRANS signal is in a low or "0" state, however, AND gates 70–74 are enabled and the error signal bits output to the error correction means 22 via lines $E_0$–$E_2$ correspond to the parity bits $P_0$–$P_2$. OR gates 78–82 provide the OR functioning for outputting either the four data error signal bits or the three parity error signal bits, as explained above.

Figure 5:
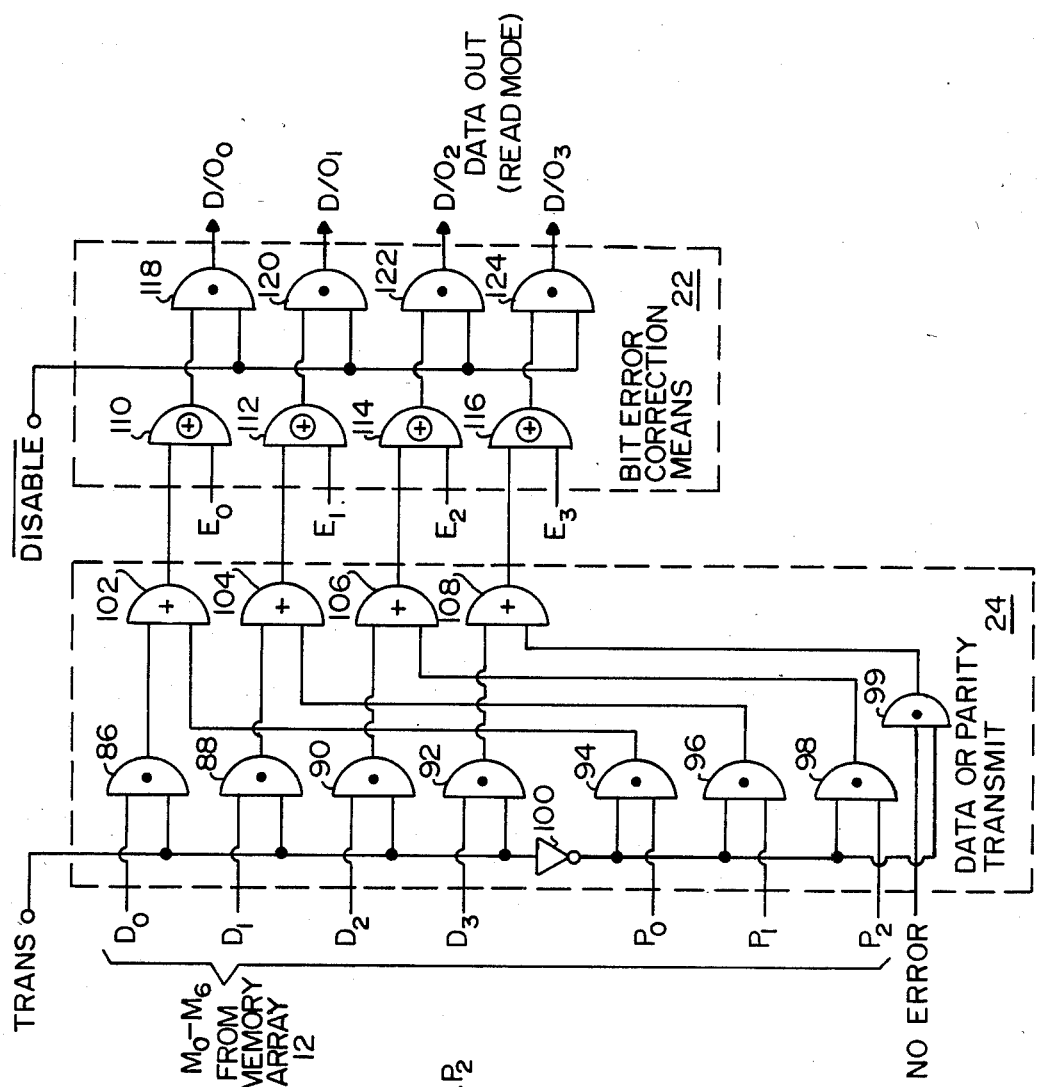
FIG. 5 is a logic diagram of the data or parity transmit and output bit error correction means shown in FIG. 1.

Referring now to FIG. 5, FIG. 5 illustrates the operation of both the data or parity transmit unit 24 and the bit error correction means 22 according to the present invention. As can be seen, the data or parity transmit 24 is substantially identical in operation to the data or parity error signal transmit 34, such that with the TRANS signal in a high state, data bits $D_0$–$D_3$ are fed through AND gates 86–92, and thereafter through OR gates 102–108, to be output as the four data bits to be fed to the bit error correction means 22. Similarly, if the TRANS signal is in a low state, invertor gate 100 acts to enable AND gates 94–98, thereby substituting the parity bits $P_0$–$P_2$ for data bits $D_0$–$D_3$ to be fed out through OR gates 102–106 to the bit error correction means 22.

It may also be desirable to monitor when no error has been detected by the error decode means 28. In this situation, as best understood with reference to FIG. 4, the "NO ERROR" signal line would be high, while all of the other outputs from the error decode means 28 would remain low. This monitoring is accomplished, with reference again to FIG. 5, by including another AND gate 99 and having this AND gate enabled by the TRANS signal in the same manner as AND gates 94–98 are enabled. Thus, with the NO ERROR signal coupled to the other input of AND gate 99, this signal is output on line D/$O_3$ via OR gate 108 whenever the TRANS signal is low. In the present embodiment, this line D/$O_3$ is a spare, since only three parity bits are output in this mode, while four output lines, D/$O_0$–D/$O_3$ are available.

As previously described, bit error correction means 22 has two functions. First, it functions to invert any specific bit in the data word (or the parity word if this mode is selected by the TRANS signal) where the state of that bit is indicated by the check word as being incorrect. The second function of the correction means 22 is to disable the data out lines D/$O_0$–D/$O_3$ if the $\overline{DISABLE}$ signal, input thereto, is high. As FIG. 5, the first function is provided by an array of four exclusive-OR gates 110, 112, 114 and 116, one input of each of which having coupled to it a respective one of the data word bits (or parity word bits) and the other input having coupled to it a corresponding one of the error signal bits $E_0$–$E_3$. Thus, the output of exclusive-OR gate 110, for example, is the present $D_0$ state input to that gate if $E_0$ is in a low state, and the opposite of this $D_0$ state if $E_0$ is in a high state. Consequently, automatic correction of a single bit error in the data word is accomplished by means of this exclusive-OR gate array 110–116.

Disabling of the data output lines D/$O_0$–D/$O_3$ is accomplished by means of conventional AND gates 118, 120, 122 and 124 whose outputs are fed respectively by the four outputs of the exclusive-OR gates 110–116 and in common by the $\overline{DISABLE}$ signal. Thus, if the $\overline{DISABLE}$ signal is low, AND gates 118–124 function to force a low or "0" signal to be output on the data out lines. With the $\overline{DISABLE}$ signal high, AND gates 118–124 act to pass unimpeded the outputs of the exclusive-OR gates 110–116 to the data out lines D/$O_0$–D/$O_3$.

Figure 6:
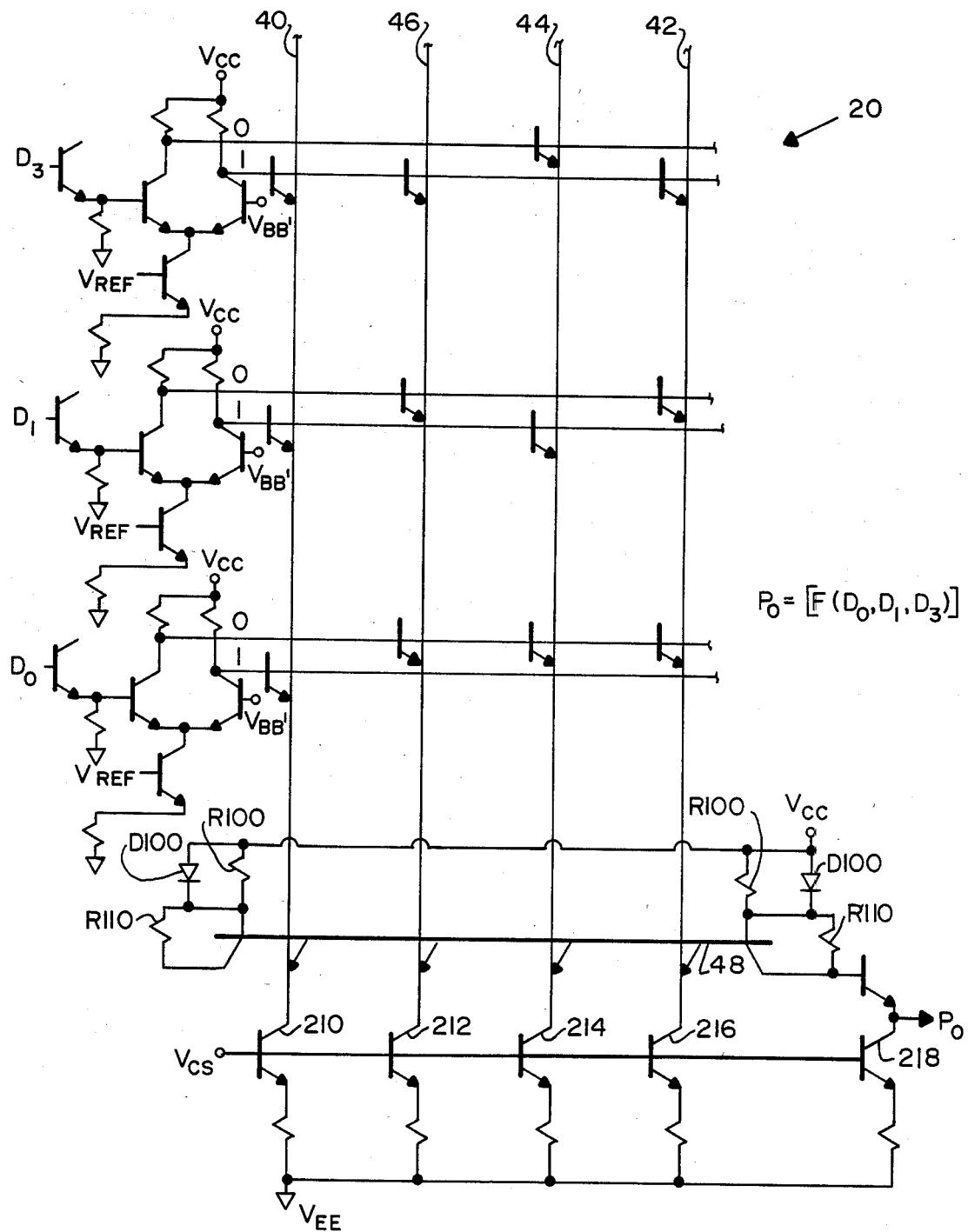
FIG. 6 is a detailed schematic of the parity word generation means of FIG. 2.

Referring now to detailed schematic embodiments of certain of the above described inventive functions, FIG. 6 illustrates a preferred schematic embodiment of parity word generation means according to the logic diagram of FIG. 2 performed by parity encoder 20. The circuit of FIG. 6 is a schematic of the generation of parity bit $P_0$ from input data bits $D_0$, $D_1$ and $D_3$. Generation of parity bits $P_1$ and $P_2$ is identical in form to the schematic of FIG. 6, so that schematic diagrams of the generation of these bits is not provided. As seen in FIG. 6, the OR-AND logic array can be conveniently implemented in emitter coupled logic (ECL) circuitry wherein the placement of emitters provides either the AND or the OR function in the circuit. This feature is also available in transistor-transistor logic (TTL) systems. ECL logic is preferred, according to the present invention, due to its higher speed characteristics as compared with other available logic circuit implementations including TTL logic.

As is seen in FIG. 6, to generate $P_0$, the OR functions of the OR gates 40–46 Shown in FIG. 2 are provided by appropriate connections of the high or the low side of each of the row lines for respective data input bits $D_0$–$D_3$ to the column OR gate lines 40–46. The AND gate 48 function of FIG. 2 is also provided in the schematic of FIG. 6 by connecting all four OR gate lines 40–46 in an extended AND structure as shown, such that only if all of the lines 40–46 are in a high state is a high output generated on the output $P_0$ line.

The parallel combination of R100 and D100, together with the voltage level shift of R110, provides conveniently adaptable "high" and "low" output levels. The inclusion of one such structure at either end of the extended AND structure significantly improves the time-transient response of this AND gate.

The transistors 210, 212, 214 and 216, whose bases are tied in common to a voltage reference $V_{cs}$ and whose collectors are tied to respective OR gate lines 40–46, provide individual current sources for each of these OR gate lines. Similarly, a transistor 218, whose base is also tied in common to $V_{cs}$ and whose collector is tied to the output $P_0$ line, provides a current source biasing for the emitter follower output for bit $P_0$.

An equivalent implementation of the above logic function may be provided by an AND-OR logic circuit, wherein the AND terms are connected in a conventional manner along a vertical common line. The outputs of these AND gates are then ORed together for generation of the desired parity bit function.

Figure 7:
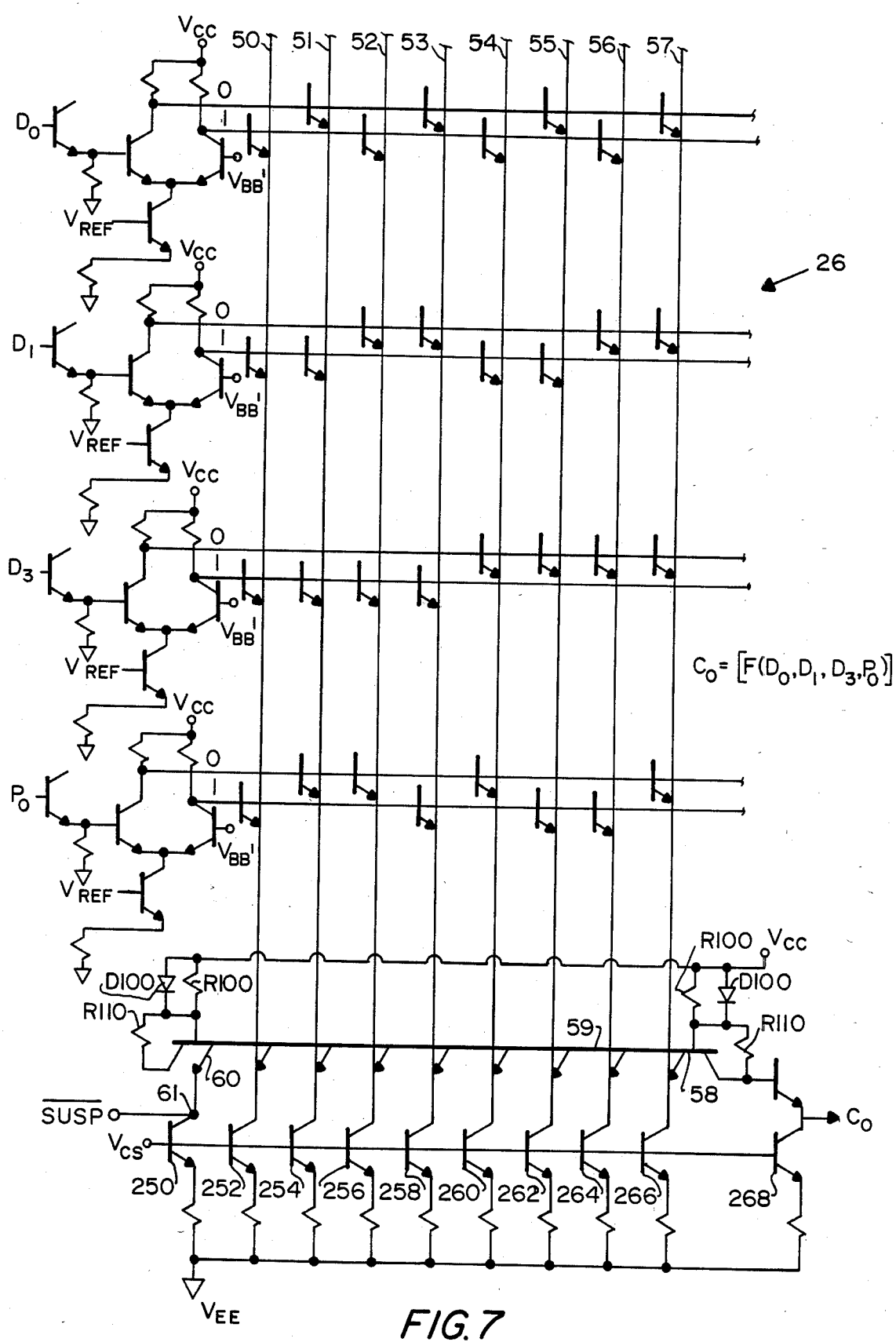
FIG. 7 is a detailed schematic of the check word generating means of FIG. 3.

A detailed schematic of the check word generating means, whose logic diagram is given in FIG. 3, is shown in FIG. 7. As can be seen, this detailed schematic is substantially identical to the parity generating means implementation as shown in the schematic of FIG. 6, described above for parity word bit generation, with the addition of a fourth set of OR terms. This fourth set is needed since there are four input terms being analyzed for each check word bit instead of the three terms analyzed for each parity bit. As with FIG. 6, only one of the output check word bits is shown being derived, by way of example. The other two check word bits are derived in substantially identical fashion. Referring now specifically to FIG. 7, each column shown, columns 50–57, represent separate OR gate functions corresponding to OR gates 50–57 shown in the logic diagram of FIG. 3. The output column line of each of these OR gates is fed to an extended AND gate function 58 including a horizontal common base line 59 having an emitter connection to each of the columns 50–57. The output of this AND gate 58 comprises the check word bit $C_0$.

A key distinction between the schematic of FIG. 7 and that of FIG. 6 is the addition in FIG. 7 of means for suspending the operation of the circuit, and thereby suspending the generation of check word bit $C_0$ as a function of the state of the error suspend signal SUSP. As can be seen, the complement of this SUSP signal is coupled directly to the base horizontal line 59 of AND gate 58 via an additional emitter 60. Consequently, this circuit combines the FIG. 3 illustrated separate functions of AND gates 58 and 60 into one gate. Thus, in operation, node 61 is normally held high, and when this emitter follower is brought to a low level, that is, when the SUSP signal goes low indicating that error correction should be suspended, emitter 60 goes on, causing AND gate 58 to be forced to a zero output level regardless of the level of the other emitter inputs to line 59. Note that, due to the unique implementation of this circuit according to the present invention, the error suspend operation can be performed at any time during the "read" cycle, is independent of and parallel to the error correction means, and is very fast.

Current sources 252–266 are coupled to the vertical lines of OR function gates 50–57, in the same manner as for the circuit of FIG. 6, to provide current sourcing for these gate functions. Similarly, current source 250 is coupled to emitter 60, to enable emitter follower operation of the SUSP signal function. Finally, the emitter follower output to output check word $C_0$ is also fed from a current source 268 to enable operation of this portion of the error detect means 26.

In FIGS. 6 and 7, as well as in the figures discussed below, the voltages used by the circuits according to the present invention range from $V_{cc}$ as the most positive ("ground" in the present embodiment) to $V_{EE}$, the most negative. In between are $V_{cs}$ and $V_{ref}$, voltages which are generally used to generate constant current sources for these circuits. Voltage source $V_{BB}{'}$ is a special voltage designed to be invariant as a function of temperature.

Figure 9:
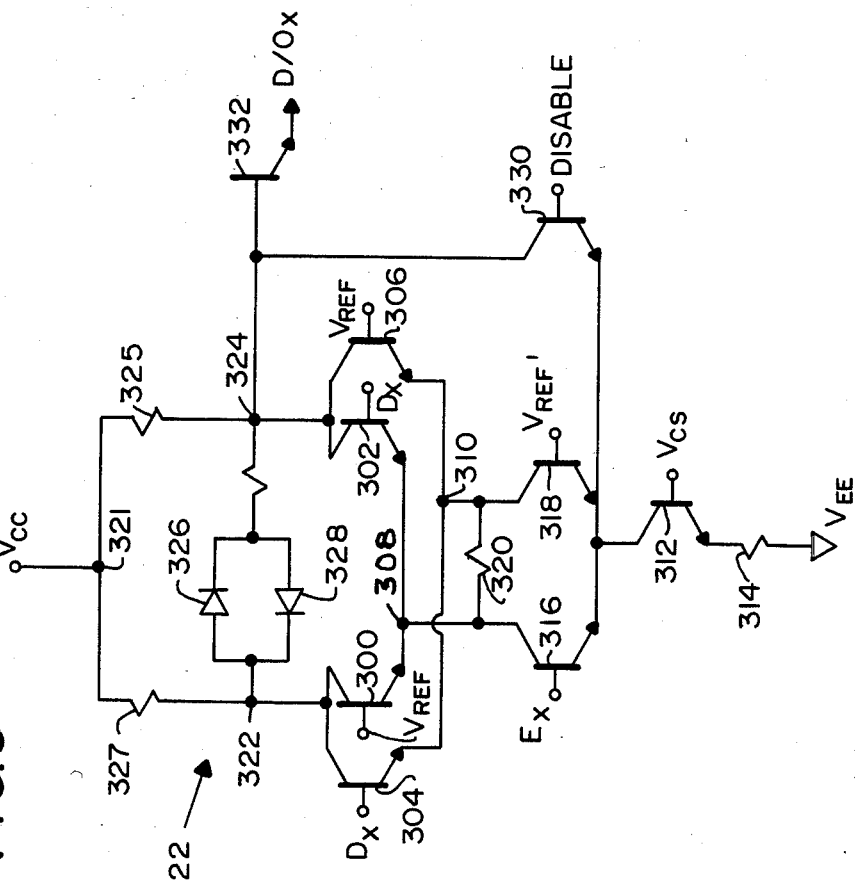
FIG. 9 is a detailed schematic of the output bit error correction means illustrated in FIG. 5.

FIG. 9 is a detailed schematic of a representative portion of the output bit error correction means 22 whose logic diagram is illustrated in FIG. 5. Each of the four output data bits $D/O_x$ would need a circuit as in FIG. 9 to implement the logic circuitry of bit error correction means 22.

Referring now to FIG. 9, a preferred embodiment of bit error correction means 22, includes two interconnected differential pairs, an inner differential pair comprising transistors 300 and 302 and an outer differential pair comprising transistors 304 and 306. The emitters of transistors 300 and 302 are tied together in common at node 308, and the emitters of transistors 304 and 306 are tied together in common at node 310. A current source is provided for nodes 308 and 310 by means of transistor 312, which is fed by voltage $V_{cs}$ and tied to a negative voltage source via resistor 314. A transistor 316 controls the coupling of node 308 to current source 312, while a transistor 318 controls the coupling of node 310 to current source 312. Resistor 320 is provided to make sure that neither node 308 or 310 is allowed to float to any abnormally high voltage. This is necessary, as described below, to insure that the output bit lines $D/O_0$–$D/O_3$ stay clamped at a certain voltage when these bit line outputs are disabled. The base input to transistors 300 and 306 is a voltage reference $V_{ref}$, the base input to both transistor 302 and transistor 304 is the data bit $D_x$. The base input to transistor 316 is the error bit $E_x$ and the base input to transistor 318 is $V_{ref}{'}$.

The collectors of transistors 300 and 304 are connected together at node 322. Similarly, the collectors of transistors 302 and 306 are connected together at node 324. Two diodes 326 and 328 are connected back-to-back between nodes 322 and 324 to provide temperature compensation for the circuit 22. Resistors 325 and 327 are coupled from ground to respective nodes 324 and 322 to provide a voltage drop from ground when a current path is created by circuit 22 to current source 312. A transistor 330, whose conductivity is controlled by the $\overline{\text{DISABLE}}$ signal is also connected between node 324 and current source 312. The voltage at node 324 is coupled out as an output bit line $D/O_x$ through an emitter follower transistor 332.

Recall that in operation of the bit error correction means 22 according to the present invention, the output data bits $D_x$ are exclusive-ORed with error bits generated by the error detect means 26 and error decode means 28. Thus, if an error bit is high, indicating that a specific data bit is in an incorrect state, the exclusive-OR gate operation of the bit error correction means 22 will cause that specific data bit to be inverted before being output on its respective $D/O_x$ data output bit line. If the error bit is low, the respective data bit is coupled unaffected through the bit error correction means 22 to the $D/O_x$ data bit line.

The circuit 22 of FIG. 9 operates to provide this function in the following novel manner. Assume first that the data bit $D_x$ retrieved from memory is a "1" and that this bit state is erroneous as indicated by the $E_x$ bit being in a "1" state. Circuit 22 corrects this erroneous data bit, by inverting this bit from a "1" to a "0" bit state. Specifically, with $E_x$ high, it causes transistor 316 to conduct, which couples current source 312 to node 308. Since $D_x$ is also high, a conductive path is also created between node 308 and node 324. Thus, current source 312 obtains current via the path through transistor 316, transistor 302, and the ground potential node 321. As a result, a voltage drop is created across resistor 325 which causes node 324 to go to a low state such that $D/O_x$ is forced to a logical zero level. As can be seen, the erroneous data bit has been overridden and the data output bit line $D/O_x$ provided with the correct data state.

If the error bit signal $E_x$ is low, then the branch of the circuit through transistor 318 is enabled. As a result, if the data input bit $D_x$ is high, a current path is created from current source 312 through transistor 318 and transistor 304 to node 322 and thereby through resistor 327 to the ground potential node 321. This causes node 322 to go low with respect to node 324, thereby enabling $D/O_x$ to output the $D_x$ high data bit state unaffected. If the input data bit $D_x$ is low, transistor 306 causes node 324 to go low, thereby reflecting this low data bit state $D_x$ on the output line $D/O_x$. Thus, as can be seen, with the error bit $E_x$ high, the data bit input to circuit 22 is automatically inverted at the output point $D/O_x$, while $D_x$ remains unaffected if $E_x$ is low.

If the $\overline{DISABLE}$ signal goes high at any time, the above described functions of the circuit 22 are bypassed and current flow from current source 312 is enabled through transistor 330 to node 324 and thereby through resistor 325 to ground node 321. As a result, the output $D/O_x$ attains a logical low regardless of the other logic inputs to circuit 22, when the $\overline{DISABLE}$ signal exists. Note that this gate functioning of the circuit 22 is provided without the addition of further gate delay to the data bit, thereby enhancing circuit speed.

Figure 8:
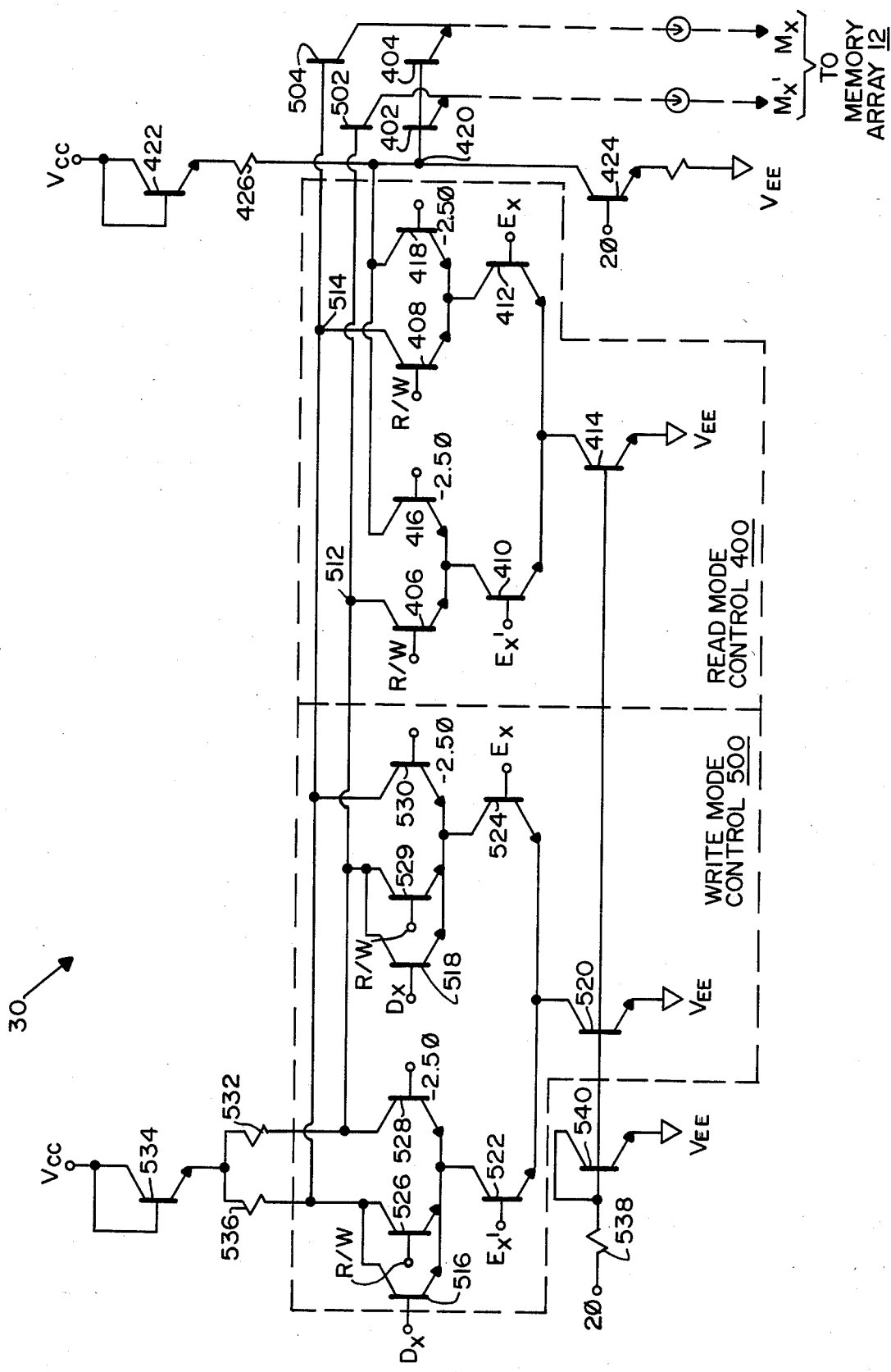
FIG. 8 is a detailed schematic of error insert means according to the present invention.
Figure 11:
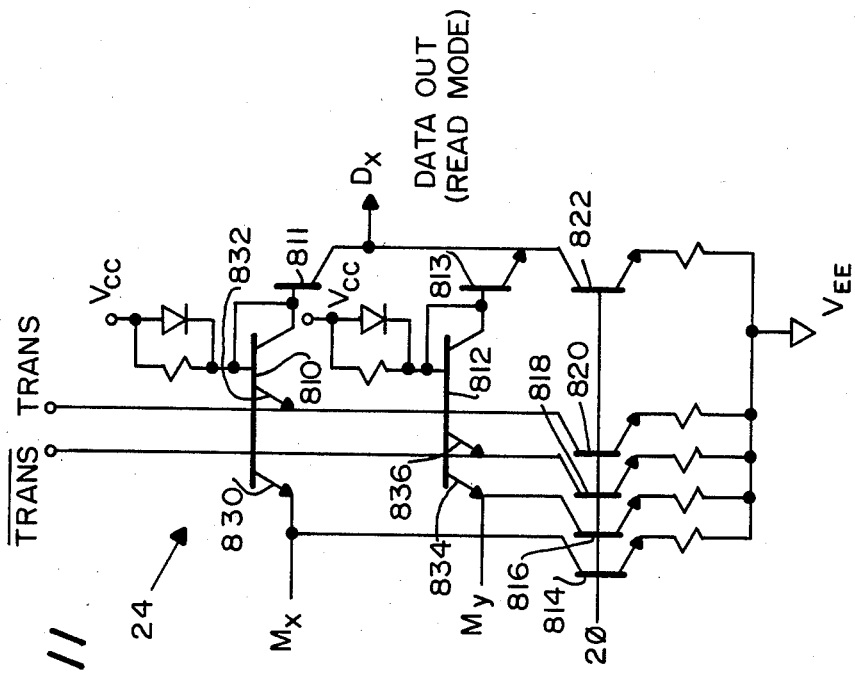
FIG. 11 is a detailed schematic of the data or parity transmit means illustrated in FIG. 5.

FIGS. 8, 10 and 11 are detailed schematics of various test circuits, described above, for testing the operation of the high speed error correcting random access memory system 10 according to the present invention.

FIG. 8 is a detailed schematic of the error insert means 30 according to the present invention. Illustrated in FIG. 8 is the detailed circuit for an exemplary single data bit $D_x$. Identical circuits for data bits $D_0-D_3$ are included in the error insert means 30, the circuit for data bit $D_x$ being illustrated by way of example. Further, since the present invention involves the storage of four data bits and three parity bits, 3 additional replications of the circuit of FIG. 8 are required for parity bits $P_0-P_2$.

As previously described, error insert means 30 provides the function of enabling the insertion of a single bit error in either the data or parity word prior to storage of these words in memory array 12 but after the parity bits have been encoded by parity encoder 20. Thus, with respect to FIG. 8, for a specific bit $D_x$ either a correct bit or an inverted bit is output to memory array 12 depending on the present state of the error insert signal $E_x$ corresponding to that specific bit. If the error insert signal $E_x$ is high for that specific bit, the present state of the bit $D_x$ is inverted, whereas if the error insert signal $E_x$ is low, the $D_x$ bit state is unaffected. Thus, means are provided for enabling the deliberate insertion of an erroneous data bit, to provide a real time electronic simulation of a "soft" error.

In a preferred embodiment of the circuit 30, both the error insert means function and also a memory array gating function is merged. This latter function causes the memory array data lines to be biased in either a read or a write mode. That is, during a write mode, the output lines $M_x$ and $M_x'$ are set up in such a way that the memory cell that is to be accessed is forced to the desired state, so that when you remove the write pulse, that accessed memory cell will retain the data state desired. The specific embodiment of FIG. 8 is a push-pull circuit wherein the line $M_x$ is the complement to the line $M_x'$, such that when one of these lines is high the other is low, thereby forcing storage of one state or the other, depending on whether you are writing a 1 or a 0 into that specific memory location. The circuit functions to merge both the error insert function and this read/write control function in a novel manner to minimize delay in the performance of these operations. The circuit 30 of FIG. 8 is therefore divided up into two separate circuit trees, a read mode control 400 and a write mode control 500. The read mode control 400 is essentially independent of the operation of the error insert means, and functions merely to provide proper biasing to the output $M_x$ and $M_x'$ lines to memory array 12, so as to enable these lines to just reflect the present voltage state of the data bit in the addressed memory cell. In other words, read mode control 400 enables the circuit 30 to be transparent to memory array 12 during a read mode operation.

The outputs of the write mode control 500 and the read mode control 400 are logic ORed by the output emitter follower transistors 402, 404, 502 and 504. Thus, the $M_x$ output line is controlled by either the emitter follower transistor 404 or emitter follower transistor 504 depending on whether or not the system 10 is in a read mode or a write mode. Similarly, the $M_x'$ output line is controlled by emitter follower transistor 402 or emitter follower transistor 502, depending again on whether or not the system 10 is in a read mode or a write mode.

Referring to the read mode control circuit 400, in a read mode, read/write control line (R/W), generated by read write control 16 from the input chip select and write enable lines, is high. The R/W signal is fed to the base of transistors 406 and 408. Since either transistor 410 or 412 will be conducting, and since one transistor is fed from the error insert bit line $E_x$ and the other is fed from the error insert complement line $E_x'$, this circuit provides a path during a read mode to either node 512 or 514. The path is either via transistor 406 or 408 from current source 414. The state of nodes 512 and 514 control the $M_x$ and $M_x'$ lines, via transistors 502 and 504. The output level of the $M_x$ and $M_x'$ lines is further adjustable at node 420 by the current through transistors 416 and 418 and by the voltage divider comprising transistors 422 and 424 and respective resistors 426 and 428 and via emitter follower transistors 402 and 404.

The novel aspect of the circuit 30 is with respect to the write mode control circuit 500 on the left hand side of FIG. 8.

Referring now to the write mode control circuit 500, the data bit line $D_x$ is input to two separate tree circuits, respectively via transistor 516 and transistor 518. Transistor 516 is coupled to a current source comprising transistor 520 via a transistor 522 whose conductivity is controlled by $E_x$, the complement of the error insert bit $E_x$. Similarly, transistor 518 is fed to current source 520 via transistor 524. The conductivity of transistor 524 is controlled by $E_x$, the error bit control signal. A second path is provided between node 514 and transistor 522 by transistor 526 which is controlled by the R/W signal. Similarly, transistor 529 provides a path between node 512 and transistor 524 with the base of transistor 529 also controlled by the R/W signal. These latter conductivity paths are essentially nonexistent during a write mode, while overriding data input transistors 516 and 518 during a read mode. Node 512 is further fed to $V_{cc}$ (ground) through a resistor 532 and transistor 534. Similarly, node 514 is fed to ground through a resistor 536 and transistor 534. The current mirror 520 is also fed from a voltage reference $2\phi$ through a resistor 538 and a transistor 540. Transistors 528 and 530, whose bases are fed from voltage reference $-2\phi$, provide conventional biasing for nodes 512 and 514 respectively. In the present embodiment, each $\phi$ (phi) of voltage equals approximately 700 mV.

In operation, if $D_x$ is a "1" for example, and we want to insert an error so that $E_x$ is also high, current source 520 derives its current from transistor 524 instead of transistor 522 and current is coupled to transistor 524 from transistor 534, resistor 532 and transistor 518. The result is that node 512, corresponding to $M_x'$ is pulled to a predetermined negative voltage. In the preferred embodiment, resistor 532 is chosen such that the voltage on node 512 for this set of inputs is $-1900$ millivolts. Of course, in this example since no current is flowing through resistor 536, the voltage on node 514 is $-760$ millivolts, the diode voltage drop created by transistor 534. As a consequence of this current steering, the output lines $M_x$ and $M_x'$ are set up as if the $D_x$ bit line were at a zero level, with a consequent result being that a zero is written into the selected memory cell even though the data input bit $D_x$ is at a 1 state. That is, an error has been deliberately inserted into that selected memory cell.

If the error insert bit $E_x$ is at a low level, however, implying that an error is not to be inserted, with $D_x$ being in a "1" state, then current source 520 obtains its current from transistor 522 via the path comprising transistor 534, resistor 536 to node 514 and thereby through transistor 516. As a consequence, with $D_x$ in a logical one state, the voltage on node 514 is now $-1900$ millivolts and the voltage on node 512 is $-760$ millivolts. This causes the data bit written into the memory cell to be in a one state in accordance with the presented data input bit $D_x$ being in a one state, i.e. the $D_x$ bit state is unchanged by circuit 30 in this case.

FIG. 10 is a detailed schematic of the test function generator means 36 which generates the transmit control signal TRANS and the error suspend signal SUSP. Test function generator 36 actually comprises two separate circuits of the type as shown in FIG. 10, one connected to the first data input bit line $D_0$ for generation of the TRANS signal, and a second connected to a second data input line $D_1$ for generation of the SUSP signal. The circuit operates to output $D_x$ (and $D_x'$) to the error insert means 30 if the input signal is at a first or a second state, and to output a TRANS signal (or a SUSP signal) if the input to that system 10 pin is in a third state.

During normal operation the portion of test function generator 36 identified at 600 provides normal memory operation, wherein the standard ECL input circuitry responds to a logic one level of between $-800$ and $-1100$ millivolts, and a logic zero level of between $-1500$ and $-1900$ millivolts, for output as the $D_x$ data bit to the error insert means 30. The circuit 700 sees both of these levels as a "1" level, and it only sees a "0" level when the input is forced to a non-standard very low voltage level on the order of $-3,000$ millivolts or lower. Only below this level does circuit 700 switch state, to generate thereby an output TRANS or SUSP signal.

The non-standard very low voltage level needed to enable operation of circuit 700 is generated by means of a transistor 706 connected to operate as a diode and a resistor 720 which feeds the base of transistor 704. Transistor 704 along with transistor 702 comprise a differential pair current switch for the circuit 700. Transistors 716 and 718 in circuit 600 comprise a similar differential transistor pair current switch for output of the data bits $D_x$ and $D_x'$ in the write mode. Both the base of transistor 718 and also diode 706 are fed from $V_{BB}'$, the temperature compensated voltage source. Transistors 708, 710, 712 and 714 provide the needed current sources for the operation of the circuits 600 and 700.

Current source transistor 714 is connected to the base of transistor 704 such that the bias voltage at this point is a function of $V_{BB}'$ and the voltage drop across diode 706 and resistor 720, as controlled by the current through transistor 714. Thus, in operation, only when the input voltage to the base of transistor 702 drops below this lowered bias voltage is an output TRANS signal generated. Resistor 720 also acts to overcome the negative temperature coefficient of the diode 706, thereby providing further temperature compensation for the circuit 700. The positive temperature coefficient of the resistor substantially compensates for the negative temperature coefficient of the diode.

This test function generator 10 circuit therefore enables multiplexing of the data input pin $D_x$ with a special function pin when the special function is desired. This is enabled also because the special function is only required during a read mode, a mode wherein no input is normally received on the $D_x$ line. The $D_x$ pin is only used to input data to the memory system 10 during a write mode. In other words, so long as the input voltage remains above $-3,000$ millivolts, the output TRANS signal is in a "1" state. Only when the input is below $-3,000$ millivolts does the output TRANS signal go to a "0" state, the state needed for generation of the special functions previously described herein.

FIG. 11 is a detailed schematic of the data or parity transmit means 24 of FIG. 5. As previously described, the data or parity signal transmit means 24 acts to selectively transmit a first bit if the TRANS signal is in a first state and to selectively transmit a second bit if the TRANS signal is in an opposite state. Referring now to FIG. 11, the two input bits selectively chosen are input bits $M_x$ and $M_y$ which are coupled to select unit 24 from the memory array 12 via respective sense amps 14. As can be seen, bit $M_x$ is fed to an emitter of transistor 810 and bit $M_y$ is fed to an emitter of transistor 812. The collector of transistor 810 is fed to the $D_x$ output bit line via emitter follower transistor 811 and the collector of transistor 812 is fed to the $D_x$ output bit line via emitter follower transistor 813. Transistors 814, 816, 818, 820 and 822 provide current sources to the emitters of transistors 810 and 812 and to the emitter follower output to the $D_x$ line generated by transistors 811 and 813.

In operation, the most common mode is where data rather than parity bits are to be output. In this mode, the TRANS signal is in a "1" state, and therefore $\overline{\text{TRANS}}$ is in a "0" state. As a result, the level at the output line $D_x$ is determined by the state of emitter 830, which in turn depends on whether bit $M_x$ is either in a high or a low state. Thus, with $M_x$ in a "1" state, it supplies the current source 814 causing emitter 830 to go off. This causes the output $D_x$ line to be at a one state of $-760$ millivolts due to the action of current source 822. Similarly, if bit $M_x$ is in a zero state, emitter 830 is on, thereby enabling transistor 810 to supply the current source. This forces the collector node of transistor 810 to −1900 millivolts, causing $D_x$ to be in an output zero state.

During the above described mode, with the TRANS signal high, transistor 812 is pulled to a zero level because emitter 836 is on. Transistor 810 can therefore override this transistor at will. If the transmit control signal TRANS is inverted, the identical process as described above occurs with respect to transistor 812, such that the present state of bit $M_y$ is transmitted out to the $D_x$ line, and the state of $M_x$ is suppressed.

It is of course understood that although a preferred embodiment of the present invention has been illustrated and described herein, various modifications, alternatives and equivalents thereto will become apparent to those skilled in the art, and, accordingly, the scope of the present invention should be defined only by the appended claims and equivalents thereof.

What is claimed is:

1. An error correcting random access memory system comprising: memory array means for storing data, said memory array means including a plurality of addressable memory words, each memory word having a predetermined equal number of memory cells; means for storing a data word input to said memory in a selected one of said memory words, said data word having a preselected number of bits of data, each bit of said data word being retained in a corresponding memory cell of said selected memory word, said preselected number of bits being less than the number of memory cells in said memory word; means for generating from said data word a parity word having a preselected plurality of parity bits, the state of each said parity bit being the function of the state of a different combination of said data word bits; means for storing said parity word in the remaining memory cells of said selected memory word; and means for outputting said data word from said memory, including: (i) means for detecting the present state of the memory cells of said selected memory word containing said data word; (ii) means for detecting the present state of the memory cells of said selected memory word containing said parity word; (iii) means for generating a check word from said data word bits and said parity word bits such that said check word state indicates if any single data word bit has switched to an erroneous state, said means including means for identifying which specific data bit is erroneous; and (iv) means responsive to said check word state for correcting any said identified erroneous data bit in said output data word.

2. The system of claim 1, further comprising error insert means for causing a selected bit in the data word input to said memory to switch to an erroneous state after said parity word is generated and for storing said data word in said selected memory word with said bit in this switched state.

3. The system of claim 1, further comprising means for selectively suspending the operation of said check word generating means, so as to cause an uncorrected data word to be output by said outputting means.

4. An error correcting random access memory system comprising: memory array means for storing data, said memory array means including a plurality of addressable memory words, each memory word having a predetermined equal number of memory cells; means for storing a data word input to said memory in a selected one of said memory words, said data word having a preselected number of bits of data, each bit of said data word being retained in a corresponding memory cell of said selected memory word, said preselected number of bits being less than the number of memory cells in said memory word; means for generating from said data word a parity word having a preselected plurality of parity bits, the state of each said parity bit being the function of the state of a different combination of said data word bits; means for storing said parity word in the remaining memory cells of said selected memory word; means for outputting said data word from said memory, including: (i) means for detecting the present state of the memory cells of said selected memory word containing said data word; (ii) means for detecting the present state of the memory cells of said selected memory word containing said parity word; (iii) means for generating a check word from said data word bits and said parity word bits such that said check word state indicates if any single data word bit has switched to an erroneous state, said means including means for identifying which specific data bit is erroneous; and (iv) means responsive to said check word state for correcting any said identified erroneous data bit in said output data word; and means for selectively outputting said parity word instead of said data word.

5. The system of claim 4 wherein said check word generating means further comprises means for causing said check word state to indicate if any single parity word bit has switched to an erroneous state, said means including means for identifying which specific parity bit is erroneous; and wherein said means for selectively outputting said parity word instead of said data word comprises means responsive to said parity bit error indicating means for correcting any said identified erroneous parity bit in said output parity word.

6. The system of claim 5 further comprising means for selectively suspending the operation of said parity bit error indicating means, so as to cause an uncorrected parity word to be output by said outputting means.

7. The system of claim 1 wherein said predetermined equal number of memory cells in each memory word comprises seven memory cells, said data word having four bits of data for storage in a corresponding four memory cells of said selected memory word, said parity word having three parity bits, for storage in the remaining three memory cells of said selected memory word.

8. The system of claim 1 wherein said error correcting random access memory is contained on a single integrated circuit chip.

9. The system of claim 1 wherein said plurality of parity bits are formed by determining the even parity of selected combinations of data bits in said data word, said means for generating a check word including means for checking the odd parity of selected combinations of data and parity bits.

10. The system of claim 1 wherein said data word includes four data bits $D_0$–$D_3$ and said parity word comprises three parity bits $P_0$–$P_2$, and wherein said parity bits are generated according to the following function:

$$P_0 = D_0 \oplus D_1 \oplus D_3$$

$$P_1 = D_0 \oplus D_2 \oplus D_3$$

$$P_2 = D_1 \oplus D_2 \oplus D_3.$$

11. The system of claim 10 wherein said means for generating a check word from said data word bits and said parity word bits comprises means for generating a three bit check word $C_0$–$C_2$ according to the following function:

$$C_0 = P_0 \oplus D_0 \oplus D_1 \oplus D_3$$

$$C_1 = P_1 \oplus D_0 \oplus D_2 \oplus D_3$$

$$C_2 = P_2 \oplus D_1 \oplus D_2 \oplus D_3.$$

12. The system of claim 1, further comprising error insert means for causing a selected bit in the parity word generated by said generating means to switch to an erroneous state and for storing said parity word in said selected memory word with said selected parity bit in this switched state.

13. An error correcting random access memory system comprising: memory array means for storing data, said memory array means including a plurality of addressable memory words, each memory word having a predetermined equal number of memory cells; means for storing a data word input to said memory in a selected one of said memory words, said data word having a preselected number of bits of data, each bit of said data word being retained in a corresponding memory cell of said selected memory word, said preselected number of bits being less than the number of memory cells in said memory word; means for generating from said data word a parity word having a preselected plurality of parity bits, the state of each said parity bit being the function of the state of a different combination of said data word bits; means for storing said parity word in the remaining memory cells of said selected memory word; and means for outputting said data word from said memory, including: (i) means for detecting the present state of the memory cells of said selected memory word containing said data word; (ii) means for detecting the present state of the memory cells of said selected memory word containing said parity word; (iii) means for generating a check word from said data word bits and said parity word bits such that said check word state indicates if any single data word bit has switched to an erroneous state, said means including means for identifying which specific erroneous data bit is erroneous, including check word decoder means for decoding said check word state such that an error signal is output on only one of a plurality of separate error signal lines, each line corresponding to a respective data bit, a respective said error signal line outputting an error signal only when a bit error has been detected in the corresponding data bit; and (iv) means responsive to said check word state for correcting any said identified erroneous data bit in said output data word, said means comprising a plurality of two input exclusive-OR gates, each said exclusive-OR gate having a respective one of said data bit signal states coupled to one input thereof, the other input of each exclusive-OR gate having a corresponding error signal line coupled thereto, such that the output of each said exclusive-OR gate corresponds to its input data bit state when the error signal line indicates no bit error, and is the opposite state when its error signal line indicates an error signal.

14. The system of claim 13 wherein each said two input exclusive-OR gate comprises a plurality of transistors cooperatively connected to generate said exclusive-OR function with only a single transistor gate delay, and means for overriding the output of each said exclusive-OR gate comprising a disable transistor whose collector is connected to the output of said exclusive-OR gate and whose emitter is coupled to a current source such that said exclusive-OR gate is forced to a logical low level regardless of the state of the inputs to said exclusive-OR gate when said disable transistor is on.

15. The system of claim 13, further comprising means for selectively disabling said data word outputting means, said means including a plurality of two input AND gates, the output of one input to said AND gate having a respective exclusive-OR gate output coupled thereto, the other input to each AND gate having a disable signal coupled thereto.

16. An error correcting random access memory system comprising: memory array means for storing data, said memory array means including a plurality of addressable memory words, each memory word having a predetermined equal number of memory cells; means for storing a data word input to said memory in a selected one of said memory words, said data word having a preselected number of bits of data, each bit of said data word being retained in a corresponding memory cell of said selected memory word, said preselected number of bits being less than the number of memory cells in said memory word; means for generating from said data word a parity word having a preselected plurality of parity bits, the state of each said parity bit being the function of the state of a different combination of said data word bits; means for storing said parity word in the remaining memory cells of said selected memory word; means for outputting said data word from said memory, including: (i) means for detecting the present state of the memory cells of said selected memory word containing said data word; (ii) means for detecting the present state of the memory cells of said selected memory word containing said parity word; (iii) means for generating a check word from said data word bits and said parity word bits such that said check word state indicates if any single data word bit has switches to an erroneous state, said means including means for identifying which specific data bit is erroneous; and (iv) means responsive to said check word state for correcting any said identified erroneous data bit in said output data word; and means for selectively-suspending the operation of said check word generating means, so as to cause an uncorrected data word to be output by said outputting means comprising means for generating a suspend signal and means responsive to said suspend signal for overriding said check word generating means and for causing said check word to be held in the state indicating that no single bit error has been identified.

17. The system of claim 16 wherein each data word bit is input to said system on a separate bit line and wherein said suspend signal generating means comprises means connected to one of said input data word bit lines for detecting a predetermined non-standard signal level and means responsive to said non-standard signal level detection for outputting said suspend signal.

18. The system of claim 16 wherein said check word state which indicates that no signal bit error has been identified is the state wherein all bits in said check word are low.

19. The system of claim 4 wherein said means for selectively outputting said parity word instead of said data word comprises means for generating a transmit control signal and means responsive to said transmit control signal for outputting said parity word instead of said data word.

20. The system of claim 19 wherein each data word bit is input to said system on a separate bit line and wherein said transmit control signal generating means comprises means connected to one of said input data word bit lines for detecting a predetermined non-standard signal level and means responsive to said non-standard signal level detection for outputting said transmit control signal.

21. An integrated circuit error correcting random access memory system comprising: memory array means for storing a plurality of four bit data words, said memory array means including a plurality of addressable memory words, each memory word having seven memory cells; means for storing the four bits of a data word input to said memory in corresponding four memory cells in a selected one of said memory words; means for generating from said data word a three bit parity word, the state of each said parity word being the function of the state of a different combination of said data word bits; means for storing said three bit parity word in the remaining three memory cells of said selected memory word; and means for outputting said data word from said memory, including: (i) means for detecting the present state of the memory cells of said selected memory word containing said data word; (ii) means for detecting the present state of the memory cells of said selected memory word containing said parity word, (iii) means for generating a three bit check word from said data word bits and said parity word bits such that any non-zero check word state indicates that one of said data word bits has switched to an erroneous state, said means including means for identifying which specific data bit is erroneous; and (iv) means responsive to any said non-zero check word state for correcting said identified erroneous data bit in said output data word.

22. The system of claim 21, further comprising: error insert means for causing a selected bit in the data word input to said memory to switch to an erroneous state after said parity word is generated and for storing said data word in said selected memory word with said bit in this switched state; means for selectively suspending the operation of said check word generating means, so as to cause an uncorrected data word to be output by said outputting means; and means for selectively outputting said parity word instead of said data word.

23. The system of claim 22 wherein said error insert means further comprises means for causing a selected bit in the parity generated by said parity word generating means to switch to an erroneous state and for storing said parity word in said selected memory word with said parity bit in this switched state.

* * * * *